United States Patent
Zhang et al.

(10) Patent No.: US 10,575,373 B2
(45) Date of Patent: Feb. 25, 2020

(54) CONNECTION STRUCTURE AND INPUT/OUTPUT CONNECTION STRUCTURE OF SEMICONDUCTOR MICROWAVE GENERATOR FOR MICROWAVE OVEN, AND MICROWAVE OVEN

(71) Applicants: GUANGDONG MIDEA KITCHEN APPLIANCES MANUFACTURING CO., LTD., Foshan (CN); MIDEA GROUP CO., LTD., Foshan (CN)

(72) Inventors: Feina Zhang, Foshan (CN); Xiangwei Tang, Foshan (CN); Xiantao Du, Foshan (CN)

(73) Assignees: GUANGDONG MIDEA KITCHEN APPLIANCES MANUFACTURING CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 583 days.

(21) Appl. No.: 15/126,559

(22) PCT Filed: Nov. 10, 2014

(86) PCT No.: PCT/CN2014/090741
§ 371 (c)(1),
(2) Date: Sep. 15, 2016

(87) PCT Pub. No.: WO2015/139464
PCT Pub. Date: Sep. 24, 2015

(65) Prior Publication Data
US 2017/0094731 A1    Mar. 30, 2017

(30) Foreign Application Priority Data
Mar. 20, 2014 (CN) .......................... 2014 1 0105584
Mar. 20, 2014 (CN) ..................... 2014 2 0128429 U
(Continued)

(51) Int. Cl.
    *H05B 6/66* (2006.01)
(52) U.S. Cl.
    CPC ...................................... *H05B 6/66* (2013.01)
(58) Field of Classification Search
    CPC . H05B 6/66; H05B 6/70; H05B 6/666; H05B 6/6417; H05B 6/686; Y02B 40/143
    (Continued)

(56) References Cited

U.S. PATENT DOCUMENTS 5,032,202 A * 7/1991 Tsai .................. H01J 37/32192
                                                      118/723 MA
5,106,594 A * 4/1992 Held ........................ A61L 2/04
                                                      219/770
(Continued)

FOREIGN PATENT DOCUMENTS

CN    201944903 U    8/2011
CN    102374557      3/2012
(Continued)

OTHER PUBLICATIONS

International Search Report dated Feb. 12, 2015 for corresponding WO Patent Application No. PCT/CN2014/090741, 3 pages.
(Continued)

*Primary Examiner* — Jimmy Chou
(74) *Attorney, Agent, or Firm* — Seed IP Law Group LLP

(57) ABSTRACT

The invention provides a connection structure and input/output connection structure of a semiconductor microwave generator for a microwave oven, and a microwave oven. The connection structure of the semiconductor microwave generator for the microwave oven comprises: a semiconductor microwave generator and a microwave output device; a microwave signal output port is provided on a front face or a back face of the semiconductor microwave generator; a first end of the microwave output device is connected to the
(Continued)

microwave signal output port, and a second end of the microwave output device communicates with a cooking cavity of the microwave oven.

20 Claims, 9 Drawing Sheets

(30) Foreign Application Priority Data

Mar. 20, 2014 (CN) .................... 2014 2 0128629 U
Mar. 20, 2014 (CN) .................... 2014 2 0128662 U

(58) Field of Classification Search
USPC ....... 219/690, 695, 696, 697, 698, 729, 709; 331/101, 767, 160
See application file for complete search history.

(56) References Cited

U.S. PATENT DOCUMENTS

| | | | | |
|---|---|---|---|---|
| 5,148,124 | A * | 9/1992 | Goff | H01P 1/227 219/209 |
| 5,870,526 | A * | 2/1999 | Aschner | C23C 16/4401 118/50.1 |
| 5,874,706 | A * | 2/1999 | Ishii | B23K 10/00 219/121.43 |
| 6,087,614 | A * | 7/2000 | Ishizuka | H01J 37/32192 219/121.43 |
| 6,403,939 | B1 * | 6/2002 | Fagrell | B01J 19/0046 204/157.43 |
| 6,441,354 | B1 * | 8/2002 | Seghatol | A61C 5/00 219/679 |
| 6,558,635 | B2 * | 5/2003 | Minaee | B01D 53/007 219/678 |
| 7,271,363 | B2 * | 9/2007 | Lee | H05H 1/46 219/121.36 |
| 7,518,092 | B2 * | 4/2009 | Purta | B01J 8/0257 219/695 |
| 8,851,886 | B2 * | 10/2014 | Morita | C23C 16/4401 118/724 |
| 10,015,846 | B2 * | 7/2018 | Tang | H05B 6/702 |
| 10,188,455 | B2 * | 1/2019 | Hancock | A61B 18/1482 |
| 2005/0268567 | A1 * | 12/2005 | Devine | H01L 21/67115 52/204.5 |
| 2006/0081624 | A1 * | 4/2006 | Takada | H01J 37/32192 219/716 |
| 2008/0008566 | A1 * | 1/2008 | Endo | F27B 17/0025 414/217.1 |
| 2009/0065486 | A1 * | 3/2009 | Yamashita | H01J 37/20 219/121.58 |
| 2009/0206071 | A1 * | 8/2009 | Mori | H05B 6/6408 219/690 |
| 2010/0051612 | A1 * | 3/2010 | Fagrell | B01J 19/126 219/748 |
| 2010/0107435 | A1 * | 5/2010 | George | B28B 11/241 34/259 |
| 2010/0126987 | A1 * | 5/2010 | Zhylkov | H05B 3/72 219/690 |
| 2010/0176123 | A1 * | 7/2010 | Mihara | H05B 6/686 219/746 |
| 2010/0224623 | A1 * | 9/2010 | Yasui | H05B 6/686 219/702 |
| 2010/0243645 | A1 * | 9/2010 | Ishizaki | H05B 6/686 219/702 |
| 2011/0139773 | A1 * | 6/2011 | Fagrell | H05B 6/46 219/702 |
| 2011/0226759 | A1 * | 9/2011 | Wander | H01L 21/67109 219/702 |
| 2012/0018410 | A1 * | 1/2012 | Zakrzewski | H01P 5/085 219/121.48 |
| 2012/0152937 | A1 * | 6/2012 | Nordh | H05B 6/642 219/702 |
| 2012/0152938 | A1 * | 6/2012 | Nordh | H05B 6/705 219/702 |
| 2012/0152940 | A1 * | 6/2012 | Oomori | H05B 6/686 219/702 |
| 2013/0072034 | A1 * | 3/2013 | Yashima | H01L 21/263 438/795 |
| 2013/0075390 | A1 * | 3/2013 | Ashida | H01J 37/32266 219/702 |
| 2013/0168389 | A1 * | 7/2013 | Ikeda | H05B 6/6402 219/756 |
| 2013/0168390 | A1 * | 7/2013 | Ikeda | H05B 6/6402 219/756 |
| 2014/0034636 | A1 * | 2/2014 | Yamamoto | H05B 6/6402 219/756 |
| 2014/0042152 | A1 * | 2/2014 | Hu | H01L 21/67109 219/679 |
| 2014/0117009 | A1 * | 5/2014 | Yamamoto | H05B 6/806 219/759 |
| 2014/0231418 | A1 * | 8/2014 | Ikeda | H05B 6/70 219/705 |
| 2015/0041458 | A1 * | 2/2015 | Muto | H05B 6/808 219/709 |
| 2015/0206808 | A1 * | 7/2015 | Tsai | H01L 21/324 438/5 |
| 2015/0351166 | A1 * | 12/2015 | Stowell | H05B 6/80 219/745 |
| 2017/0359863 | A1 * | 12/2017 | Frank | H05B 6/6417 |
| 2019/0090317 | A1 * | 3/2019 | Sadahira | H05B 6/68 |

FOREIGN PATENT DOCUMENTS

| | | |
|---|---|---|
| CN | 202303515 U | 7/2012 |
| CN | 02767855 | 11/2012 |
| CN | 102769952 | 11/2012 |
| CN | 203103501 U | 7/2013 |
| CN | 103378390 A | 10/2013 |
| CN | 103512060 | 1/2014 |
| CN | 103563482 | 2/2014 |
| CN | 103912900 | 7/2014 |
| CN | 203757795 U | 8/2014 |
| CN | 203757796 U | 8/2014 |
| CN | 203757797 U | 8/2014 |
| JP | 11977007450 U | 1/1977 |
| JP | 2007280786 A | 1/2007 |
| JP | 2008034166 A * | 2/2008 |
| JP | 2008034166 A | 2/2008 |
| WO | 2011149275 A2 | 12/2011 |

OTHER PUBLICATIONS

Extended European Search Report dated Nov. 23, 2017 for corresponding European Patent Application No. 14886039.8, 12 pages.
Canadian Office Action dated Jan. 4, 2018 for corresponding Patent Application No. 2,942,672, 3 pages.
English Abstracts of Foreign Publications listed in this Information Disclosure Statement (14 pages).
European Office Action, dated Sep. 10, 2019, for European Application No. 14886039.8-1204, 8 pages.

* cited by examiner

CONNECTION STRUCTURE AND INPUT/OUTPUT CONNECTION STRUCTURE OF SEMICONDUCTOR MICROWAVE GENERATOR FOR MICROWAVE OVEN, AND MICROWAVE OVEN

CROSS-REFERENCE TO RELATED APPLICATIONS

This application is the national phase entry of international patent application No. PCT/CN2014/090741 filed on Nov. 10, 2014, the disclosure of which is hereby incorporated herein by reference in its entirety for all purposes.

STATEMENT REGARDING FEDERALLY SPONSORED RESEARCH OR DEVELOPMENT

Not Applicable.

BACKGROUND

Technical Field

The present invention relates to the field of household appliances, and more specifically, to a connection structure of a semiconductor microwave generator for a microwave oven and a microwave oven comprising the connection structure of the semiconductor microwave generator, an input/output connection structure of a semiconductor microwave generator for a microwave oven and a microwave oven comprising the input/output connection structure of the semiconductor microwave generator, and another connection structure of a semiconductor microwave generator for a microwave oven and a microwave oven comprising the connection structure of the semiconductor microwave generator.

Background of the Invention

As shown in FIG. 1, for an existing connection structure of a semiconductor microwave generator 10' for a microwave oven, a microwave output port is mostly arranged in a side face of the semiconductor microwave generator 10', and a microwave output device, such as a radio-frequency connector 20' or the like, is connected with the microwave output port on the side face and leads out microwave signals from a PCB (Printed Circuit Board).

In order to achieve microwave transmission, the microwave signals led out by the radio-frequency connector 20' from the semiconductor microwave generator 10' need to be transferred to a microwave feed-in device by way of direct connection, cable connection or the like, and finally input into a waveguide box.

As shown in FIGS. 2A to 2B, microwaves of a microwave oven used in the prior art are mainly fed in from the top, the bottom, the left side, the right side and the like of a cooking cavity 30', and the radio-frequency connector 20' is connected to the side face of the semiconductor microwave generator 10' so that a maximum distance between the semiconductor microwave generator 10' and the cooking cavity 30' is relatively large, i.e., an value L is relatively large, thereby leading to an increase of the size of the microwave oven; as a result, the structural design and the shape of the microwave oven are restricted, and thus the manufacturing costs of the microwave oven thus are increased.

In order to solve the above problem, the waveguide box is connected with the semiconductor microwave generator 10' by way of cable connection to achieve microwave transmission in the prior art; although the size of the microwave can be reduced in this way, transmission loss and working time are increased, which may result in insufficient heating of food within predetermined heating time; moreover, it may lead to low production efficiency for batch production.

The microwave oven is a common appliance for heating or cooking, with the principle of causing high-frequency oscillation of water molecules of food by using microwaves, thereby generating heat by friction to heat or cook the food. A traditional microwave oven comprises such parts as a power source, a transformer, a magnetron, a high-voltage capacitor, a cavity and an oven door, wherein the magnetron is a core part generating microwaves, which is excited by the high-voltage power source to generate microwaves that are transmitted and coupled into the cavity for holding food by means of a waveguide. The working voltage of the magnetron of the traditional microwave oven is 4000V, with potential safety hazards in power utilization and large losses, and also great limitations to the shape of the microwave oven.

With technological development, there emerges a semiconductor microwave oven using a semiconductor microwave generator in place of the magnetron for generating microwaves, wherein the semiconductor microwave generator mainly comprises a microwave signal generating circuit and a power amplifying circuit; microwaves are led out from the microwave generator by means of a connecting device, fed in the waveguide box in a certain way and uniformly transmitted to the cavity at last. The microwave generator is powered by a full DC low voltage, and is safe in power utilization, low in loss and long in service life; meanwhile, diversification of the shape of the microwave oven can be achieved.

For the currently used connection structure of the semiconductor microwave generator for the microwave oven, a signal input port and a signal output port are mostly arranged in a side face of the microwave generator, and a radio-frequency connector is connected with the signal input port and the signal output port on the side face, provide microwave signals to the PCB (Printed Circuit Board) and also leads out microwave signals from the PCB.

However, as the radio-frequency connector is connected to the side face of the microwave generator, the maximum distance between the microwave generator and the cooking cavity is relatively large, leading to an increase of the size of the microwave oven; as a result, the structural design and the shape of the microwave oven are restricted, and thus the manufacturing costs of the microwave thus are increased.

SUMMARY

The present invention is intended to solve one of the technical problems existing in the prior art.

To this end, a first object of the present invention is to provide a connection structure of a semiconductor microwave generator for a microwave oven, which is structurally simple and compact and capable of effectively shortening a distance between the microwave generator and a cooking cavity and guaranteeing the microwave conduction efficiency.

A second object of the present invention is to provide a microwave oven that comprises the above connection structure of the semiconductor microwave generator.

A third object of the present invention is to provide an input/output connection structure of a semiconductor microwave generator for a microwave oven, which is structurally simple and compact and capable of effectively shortening a distance between the microwave generator and a cooking cavity.

A fourth object of the present invention is to provide a microwave oven that comprises the above input/output connection structure of the semiconductor microwave generator.

A fifth object of the present invention is to provide a connection structure of a semiconductor microwave generator for a microwave oven, which is structurally simple and compact and capable of effectively shortening a distance between the microwave generator and a cooking cavity.

A sixth object of the present invention is to provide a microwave oven that comprises the above connection structure of the semiconductor microwave generator.

In order to achieve the above objects, embodiments in the first aspect of the present invention provide a connection structure of a semiconductor microwave generator for a microwave oven, which comprises a semiconductor microwave generator, on a front face or a back face of which a microwave signal output port is provided, and a microwave output device, wherein a first end of the microwave output device is connected to the microwave signal output port, and a second end of the microwave output device communicates with a cooking cavity of the microwave oven.

According to the connection structure of the semiconductor microwave generator for the microwave oven provided by the present invention, the microwave signal output port is arranged on the front face or the back face of the semiconductor microwave generator; the first end of the microwave output device is connected with the microwave signal output port, and the second end of the microwave output device communicates with the cooking cavity. That is, the microwave output device is vertically connected with the front face or the back face of the semiconductor microwave generator, which effectively reduces the maximum distance between the semiconductor microwave generator and the cooking cavity, i.e., greatly reducing the value L, and further effectively reduces the size of the microwave oven, providing simple and convenient structural design and shape design of the microwave oven, thus effectively reducing the manufacturing costs of the microwave oven.

In addition, the connection structure of the semiconductor microwave generator for the microwave oven provided by the embodiments in the first aspect of the present invention also has the following additional technical features:

According to one embodiment of the present invention, a waveguide box is arranged on a wall of the cooking cavity, and communicates with the cooking cavity; a waveguide hole is formed in a top surface of the waveguide box; the semiconductor microwave generator comprises a radiator, a metal substrate that is mounted on the radiator, a printed circuit board, the microwave signal output port being arranged on a front face of the printed circuit board and a back face of the printed circuit board being fixedly connected with the metal substrate; and a shielding case that covers the front face and side faces of the printed circuit board; the first end of the microwave output device penetrates through the shielding case to be connected with the microwave signal output port, and the second end of the microwave output device communicates with the waveguide box by means of the waveguide hole.

The waveguide box arranged on the cooking cavity makes the connection between the microwave output device and the cooking cavity simple and convenient. The radiator effectively ensures that the heat of the printed circuit board can be dissipated to the outside immediately, thereby guaranteeing the service life of the printed circuit board. The metal substrate makes the connection between the printed circuit board and the radiator simple and convenient, and due to good thermal conductivity of the metal, the heat dissipation effect of the printed circuit board is effectively guaranteed. The shielding case is arranged to effectively ensure the leakproofness of the semiconductor microwave generator, so that microwaves emitted by the semiconductor microwave generator may completely enter the cooking cavity via the microwave output device and the waveguide box.

According to one embodiment of the present invention, the microwave output device comprises a first radio-frequency connector, a socket of which is connected with the microwave signal output port, and a second radio-frequency connector, a socket of which is connected with the waveguide box by means of the waveguide hole; a plug of the first radio-frequency connector is connected with a plug of the second radio-frequency connector, and one of the plug of the first radio-frequency connector and the plug of the second radio-frequency connector is a male terminal, and the other one is a female terminal.

The microwave output device comprises the first radio-frequency connector and the second radio-frequency connector, which are mounted on the semiconductor microwave generator and the waveguide box, respectively. By means of the connection of the matched plugs of the first radio-frequency connector and the second radio-frequency connector, the semiconductor microwave generator communicates with the cavity of the microwave oven. The radio-frequency connectors are simple in structure and convenient to mount; therefore, the mounting difficulty of the connection structure of the semiconductor microwave generator is effectively reduced, and the assembly efficiency of the connection structure of the semiconductor microwave generator is improved.

According to one embodiment of the present invention, the microwave output device further comprises a microwave feed-in device, by means of which the socket of the second radio-frequency connector is connected with the waveguide box.

The microwave feed-in device is arranged to effectively ensure the microwave transmission efficiency, thereby effectively guaranteeing sufficient heating of food in the cooking cavity within predetermined heating time and further effectively improving the product quality.

According to one embodiment of the present invention, the microwave feed-in device is an antenna or a probe.

Both the antenna and the probe have the advantage of high efficiency, and can effectively improve the microwave transmission efficiency.

According to one embodiment of the present invention, the microwave output device is a magnetron output assembly that comprises a magnetron antenna, a first bottom plate, a first fixing ring and a second fixing ring; the first fixing ring, the second fixing ring and the first bottom plate are connected successively; the first bottom plate is connected with the waveguide box; the magnetron antenna is fixed on the waveguide box by means of the first fixing ring, the second fixing ring and the first bottom plate; one end of the magnetron antenna penetrates through the shielding case to be connected with the microwave signal output port.

The magnetron output assembly comprises the magnetron antenna, the first bottom plate, the first fixing ring and the second fixing ring, and is simple in structure, and easy to manufacture and shape; therefore, the manufacturing difficulty of the microwave output device is effectively reduced.

Moreover, the magnetron output assembly has the advantages of high power, high efficiency, small size, low weight, low cost and the like, thereby effectively guaranteeing sufficient heating of food in the cooking cavity within predetermined heating time and further effectively improving the product quality.

According to one embodiment of the present invention, the microwave output device is a probe output assembly that comprises a probe, a second bottom plate and a third fixing ring; the third fixing ring is connected with the second bottom plate that is fixedly connected with the waveguide box; the probe is fixed on the waveguide box by means of the second bottom plate and the third fixing ring; one end of the probe penetrates through the shielding case to be connected with the microwave signal output port.

The probe output assembly comprises the probe, the second bottom plate and the third fixing ring, and is simple in structure, and easy to manufacture and shape; therefore, the manufacturing difficulty of the microwave output device is effectively reduced. Moreover, the probe has good microwave conduction efficiency, thereby effectively guaranteeing sufficient heating of food in the cooking cavity within predetermined heating time and further effectively improving the product quality.

According to one embodiment of the present invention, the semiconductor microwave generator comprises a metal substrate that is mounted on the cooking cavity, a printed circuit board, the microwave signal output port being arranged on a front face of the printed circuit board and the back face of the printed circuit board being fixedly connected with the metal substrate; and a shielding case that covers a front face and side faces of the printed circuit board. The first end of the microwave output device penetrates through the metal substrate to be connected with the microwave signal output port.

When the microwave oven is a flat-plate microwave oven without the waveguide box, the semiconductor microwave generator is provided with no radiator. The metal substrate is closely attached on the cooking cavity, and thus cooled by means of the cooking cavity and simultaneously transmits part of its heat into the cavity. In this way, utilization of waste heat is achieved; the energy utilization rate is effectively increased and the energy sources are saved.

Embodiments in the second aspect of the present invention provide a microwave oven, which comprises a cooking cavity, and the above connection structure of the semiconductor microwave generator for the microwave oven provided by any embodiment in the first aspect. The second end of the microwave output device of the connection structure of the semiconductor microwave generator for the microwave oven communicates with the cooking cavity.

The microwave oven provided by the embodiments in the second aspect of the present invention comprises the above connection structure of the semiconductor microwave generator for the microwave oven provided by any embodiment in the first aspect, and thus the microwave oven has all the beneficial effects of the above connection structure of the semiconductor microwave generator for the microwave oven provided by any embodiment in the first aspect. That is, the microwave oven has the advantages of small size, low cost and the like.

According to one embodiment of the present invention, the connection structure of the semiconductor microwave generator for the microwave oven is located on a top wall, a bottom wall, a side wall or a rear wall of the cooking cavity.

The connection structure of the semiconductor microwave generator is located on the top wall, the bottom wall, the side wall or the rear wall of the cooking cavity, and thus can be mounted simply and conveniently; therefore, the structural design and the shape design of the microwave oven is simple and convenient, and further, the production efficiency of the microwave oven is effectively improved.

Embodiments in the third aspect of the present invention provide an input/output connection structure of a semiconductor microwave generator for a microwave oven, which comprises a semiconductor microwave generator that is provided with a microwave signal output port and a microwave signal input port, the microwave signal output port being located on a front face or a back face of the semiconductor microwave generator; a microwave input device that is mounted on the semiconductor microwave generator and connected with the microwave signal input port; and a microwave output device that is mounted on the semiconductor microwave generator and connected with the microwave signal output port.

According to the input/output connection structure of the semiconductor microwave generator for the microwave oven provided by the present invention, the microwave signal output port is arranged on the front face or the back face of the semiconductor microwave generator; the microwave output device is mounted on the semiconductor microwave generator oppositely to the microwave signal output port, and connected with the microwave signal output port. That is, the microwave output device is vertically connected with the front face or the back face of the semiconductor microwave generator, which effectively reduces the maximum distance between the semiconductor microwave generator and the cooking cavity, and further effectively reduces the size of the microwave oven, providing simple and convenient structural design and shape design of the microwave oven, thus effectively reducing the manufacturing costs of the microwave oven. The microwave input device is arranged to effectively ensure that the semiconductor microwave generator is capable of simultaneously receiving and sending microwave signals.

In addition, the input/output connection structure of the semiconductor microwave generator for the microwave oven provided by the embodiments in the third aspect of the present invention also has the following additional technical features:

According to one embodiment of the present invention, the semiconductor microwave generator comprises a metal substrate; a printed circuit board, a back face of the printed circuit board being fixedly connected with the metal substrate, the microwave signal output port and the microwave signal input port both being arranged on the printed circuit board, and the microwave signal output port being located on either a front face or the back face of the printed circuit board; and a shielding case that covers the front face and side faces of the printed circuit board; the microwave output device penetrates through the shielding case or the metal substrate to be mounted on the printed circuit board.

The metal substrate makes the connection between the printed circuit board and the radiator simple and convenient, and due to good thermal conductivity of the metal, the heat dissipation effect of the printed circuit board is effectively guaranteed. The shielding case is arranged to effectively ensure the leakproofness of the semiconductor microwave generator.

According to one embodiment of the present invention, the microwave output device is a first radio-frequency connector, a socket of which is connected with the microwave signal output port, and a plug of which extends out of the shielding case or the metal substrate, and is fixedly connected with the shielding case or the metal substrate by means of a first flange plate.

The radio-frequency connector is simple in structure and convenient to mount; therefore, the mounting difficulty of the connection structure of the semiconductor microwave generator is effectively reduced, and the assembly efficiency of the connection structure of the semiconductor microwave generator is improved. The first flange plate is arranged to guarantee the strength of the connection between the plug of the first radio-frequency connector and the shielding case or the metal substrate on one hand, and guarantee the leakproofness between the plug of the first radio-frequency connector and the semiconductor microwave generator on the other hand.

According to one embodiment of the present invention, the socket of the first radio-frequency connector is welded, clamped or screwed to the printed circuit board.

Welded, clamped and screwed connections all have good connection strength, thereby effectively guaranteeing the strength of the connection between the socket of the first radio-frequency connector and the printed circuit board.

According to one embodiment of the present invention, the microwave output device is a magnetron output assembly that comprises a magnetron antenna, a first bottom plate and a first fixing ring; the first fixing ring and the first bottom plate are sleeved on the magnetron antenna; one end of the magnetron antenna penetrates through the shielding case or the metal substrate to be connected with the microwave signal output port.

The magnetron output assembly comprises the magnetron antenna, the first bottom plate and the first fixing ring, and is simple in structure, and easy to manufacture and shape; therefore, the manufacturing difficulty of the microwave output device is effectively reduced. Moreover, the magnetron output assembly has the advantages of high power, high efficiency, small size, low weight, low cost and the like, thereby effectively guaranteeing sufficient heating of food in the cooking cavity within predetermined heating time and further effectively improving the product quality.

According to one embodiment of the present invention, the microwave output device is a probe output assembly that comprises a probe, a second bottom plate and a second fixing ring; the second fixing ring and the second bottom plate are sleeved on the probe; one end of the probe penetrates through the shielding case or the metal substrate to be connected with the microwave signal output port.

The probe output assembly comprises the probe, the second bottom plate and the second fixing ring, and is simple in structure, and easy to manufacture and shape; therefore, the manufacturing difficulty of the microwave output device is effectively reduced. Moreover, the probe has good microwave conduction efficiency, thereby effectively guaranteeing sufficient heating of food in the cooking cavity within predetermined heating time and further effectively improving the product quality.

According to one embodiment of the present invention, the microwave input device is a second radio-frequency connector, a socket of which is connected with the microwave signal input port, and a plug of which is located outside the semiconductor microwave generator.

The radio-frequency connector is simple in structure and convenient to mount; therefore, the mounting difficulty of the connection structure of the semiconductor microwave generator is effectively reduced, and the assembly efficiency of the connection structure of the semiconductor microwave generator is improved.

According to one embodiment of the present invention, the microwave signal input port is located on the front face, the back face or the side face of the printed circuit board; the plug of the second radio-frequency connector penetrates through the shielding case or the metal substrate, and is fixedly connected with the shielding case or the metal substrate by means of a second flange plate.

The plug of the second radio-frequency connector is fixedly connected with the shielding case or the metal substrate by means of the second flange plate. The second flange plate is arranged to guarantee the strength of the connection between the plug of the second radio-frequency connector and the shielding case or the metal substrate on one hand, and guarantee the leakproofness between the plug of the second radio-frequency connector and the semiconductor microwave generator on the other hand.

Embodiments in the fourth aspect of the present invention provide a microwave oven, which comprises a cooking cavity, and the above input/output connection structure of the semiconductor microwave generator for the microwave oven provided by any embodiment in the third aspect. The microwave input device of the input/output connection structure of the semiconductor microwave generator for the microwave oven communicates with the cooking cavity.

The microwave oven provided by the embodiments in the fourth aspect of the present invention comprises the above input/output connection structure of the semiconductor microwave generator for the microwave oven provided by any embodiment in the third aspect, and thus the microwave oven has all the beneficial effects of the above input/output connection structure of the semiconductor microwave generator for the microwave oven provided by any embodiment in the third aspect. That is, the microwave oven has the advantages of small size, low cost and the like.

According to one embodiment of the present invention, the input/output connection structure of the semiconductor microwave generator for the microwave oven is located on a top wall, a bottom wall, a side wall or a rear wall of the cooking cavity.

The input/output connection structure of the semiconductor microwave generator is located on the top wall, the bottom wall, the side wall or the rear wall of the cooking cavity, and thus can be mounted simply and conveniently; therefore, the structural design and the shape design of the microwave oven is simple and convenient, and further, the production efficiency of the microwave oven is effectively improved.

Embodiments in the fifth aspect of the present invention provide a connection structure of a semiconductor microwave generator for a microwave oven, which comprises a semiconductor microwave generator that is provided with a microwave signal output port and a microwave signal input port, the microwave signal output port being located on a front face or a back face of the semiconductor microwave generator; a microwave input device that is connected with the microwave signal input port; and a microwave output device that is connected with the microwave signal output port by means of a converter.

According to the connection structure of the semiconductor microwave generator for the microwave oven provided by the present invention, the microwave signal output port is arranged on the front face or the back face of the semiconductor microwave generator; and the microwave output device is connected with the microwave signal output port by means of the converter. That is, the microwave output device is vertically connected with the front face or the back face of the semiconductor microwave generator, which effectively reduces the maximum distance between the semiconductor microwave generator and the cooking cavity, and further effectively reduces the size of the microwave oven, providing simple and convenient structural design and shape design of the microwave oven, thus effectively reducing the manufacturing costs of the microwave oven. In addition, the converter is simple in structure, such that the connection between the microwave output device and the microwave signal output port is simple and reliable; therefore, the assembly difficulty of the connection structure of the semiconductor microwave generator is effectively reduced.

In addition, the connection structure of the semiconductor microwave generator for the microwave oven provided by the embodiments in the fifth aspect of the present invention also has the following additional technical features:

According to one embodiment of the present invention, the semiconductor microwave generator comprises a radiator; a metal substrate that is mounted on the radiator, a printed circuit board, a back face of which is fixedly connected with the metal substrate, and on which the microwave signal output port and the microwave signal input port are both arranged, the microwave signal output port being located on either the front face or the back face of the printed circuit board, and the converter being mounted on the printed circuit board oppositely to the microwave signal output port; and a shielding case that covers the front face and side faces of the printed circuit board.

The radiator effectively ensures that the heat of the printed circuit board can be dissipated to the outside immediately, thereby guaranteeing the service life of the printed circuit board. The metal substrate makes the connection between the printed circuit board and the radiator simple and convenient, and due to good thermal conductivity of the metal, the heat dissipation effect of the printed circuit board is effectively guaranteed. The shielding case is arranged to effectively ensure the leakproofness of the semiconductor microwave generator.

According to one embodiment of the present invention, the converter is provided with a microstrip line; a first end of the microstrip line is connected with the microwave output device, and a second end of the microstrip line is connected with the microwave signal output port.

The microwave output device is connected with the semiconductor microwave generator by means of the microstrip line on the converter; microwave signals are conducted by means of the microstrip line, and the microwave signal conduction efficiency thus is effectively guaranteed.

According to one embodiment of the present invention, the microwave output device is a radio-frequency connector, a socket of which is connected with the first end of the microstrip line.

The radio-frequency connector is simple in structure and convenient to mount; therefore, the mounting difficulty of the connection structure of the semiconductor microwave generator is effectively reduced, and the assembly efficiency of the connection structure of the semiconductor microwave generator is improved.

According to one embodiment of the present invention, the socket of the radio-frequency connector is welded, clamped or screwed to the converter; the converter is welded, clamped or screwed to the printed circuit board.

Welded, clamped and screwed connections all have good connection strength, thereby effectively guaranteeing the strength of the connection between the socket of the radio-frequency connector and the printed circuit board, and the strength of the connection between the converter and the printed circuit board.

According to one embodiment of the present invention, the converter is a metal block; an epoxy resin layer is arranged between the microstrip line and the metal block.

The epoxy resin part is used to isolate the microstrip line from the metal block, thereby effectively avoiding the influence of the metal block on the usability of the microstrip line; therefore, the using effect of the microstrip line is guaranteed.

According to one embodiment of the present invention, the microwave output device is a magnetron output assembly that comprises a magnetron antenna, a first bottom plate and a first fixing ring; the first fixing ring and the first bottom plate are sleeved on the magnetron antenna; one end of the magnetron antenna is connected with the first end of the microstrip line.

The magnetron output assembly comprises the magnetron antenna, the first bottom plate and the first fixing ring, and is simple in structure, and easy to manufacture and shape; therefore, the manufacturing difficulty of the microwave output device is effectively reduced. Moreover, the magnetron output assembly has the advantages of high power, high efficiency, small size, low weight, low cost and the like, thereby effectively guaranteeing sufficient heating of food in the cooking cavity within predetermined heating time and further effectively improving the product quality.

According to one embodiment of the present invention, the microwave output device is a probe output assembly that comprises a probe, a second bottom plate and a second fixing ring; the second fixing ring and the second bottom plate are sleeved on the probe; one end of the probe is connected with the first end of the microstrip line.

The probe output assembly comprises the probe, the second bottom plate and the second fixing ring, and is simple in structure, and easy to manufacture and shape; therefore, the manufacturing difficulty of the microwave output device is effectively reduced. Moreover, the probe has good microwave conduction efficiency, thereby effectively guaranteeing sufficient heating of food in the cooking cavity within predetermined heating time and further effectively improving the product quality.

Embodiments in the sixth aspect of the present invention provide a microwave oven, which comprises a cooking cavity, and the above connection structure of the semiconductor microwave generator for the microwave oven provided by any embodiment in the fifth aspect. The microwave output device of the connection structure of the semiconductor microwave generator for the microwave oven communicates with the cooking cavity.

The microwave oven provided by the embodiments in the sixth aspect of the present invention comprises the above connection structure of the semiconductor microwave generator for the microwave oven provided by any embodiment in the fifth aspect, and thus the microwave oven has all the beneficial effects of the above connection structure of the semiconductor microwave generator for the microwave oven provided by any embodiment in the fifth aspect. That is, the microwave oven has the advantages of small size, low cost and the like.

According to one embodiment of the present invention, the connection structure of the semiconductor microwave generator for the microwave oven is located on a top wall, a bottom wall, a side wall or a rear wall of the cooking cavity.

The connection structure of the semiconductor microwave generator is located on the top wall, the bottom wall, the side wall or the rear wall of the cooking cavity, and thus can be mounted simply and conveniently; therefore, the structural design and the shape design of the microwave oven is simple and convenient, and further, the production efficiency of the microwave oven is effectively improved.

The additional aspects and advantages of the present invention will be illustrated in the following descriptions, and part of them will become apparent from the following descriptions or may be known from the practices of the present invention.

BRIEF DESCRIPTION OF THE DRAWINGS

The above and/or additional aspects and advantages of the present invention will become apparent and readily comprehensible from descriptions on embodiments in conjunction with the following drawings, in which.

Specifically, in FIGS. 1 to 2B, corresponding relations between drawing reference signs and names of parts are as follows:

10' Microwave generator, 20' Radio-frequency connector, and 30' Cooking cavity

In FIGS. 3 to 17, corresponding relations between drawing reference signs and names of parts are as follows:

10 Semiconductor microwave generator, 11 Radiator, 12 Metal substrate, 13 Printed circuit board, 131 Microwave signal output port, 132 Microwave signal input port, 14 Shielding case, 20 Microwave output device, 21 First radio-frequency connector, 211 Socket of the first radio-frequency connector, 212 Plug of the first radio-frequency connector, 22 Second radio-frequency connector, 221 Socket of the second radio-frequency connector, 222 Plug of the second radio-frequency connector, 23 Feed-in device, 24 Inner conductor, 25 Outer conductor, 26 Microstrip line, 30 Magnetron output assembly, 311 Ceramic ring, 312 Positive output end tube shell, 313 Exhaust port, 314 Magnetron antenna, 315 Antenna cap, 32 First bottom plate, 33 First fixing ring, 34 Second fixing ring, 40 Probe output assembly, 41 Probe, 42 Second bottom plate, 43 Third fixing ring, 50 Cooking cavity, 60 Waveguide box, 71 First flange plate, 72 Second flange plate, 80 Converter, 81 Microstrip line of converter, 90 Third radio-frequency connector, 91 Socket of the third radio-frequency connector, and 92 Plug of the third radio-frequency connector.

DETAILED DESCRIPTION

In order to give a clearer understanding of the above objects, features and advantages of the present invention, the present invention will be further described in detail below in conjunction with the accompanying drawings and specific embodiments. It needs to be noted that the embodiments of the present application and the features in the embodiments can be combined with one another without conflict.

Many specific details are elaborated in the following descriptions to make the present invention adequately understandable. However, the present invention may also be implemented in other ways than those described herein; therefore, the protection scope of the present invention is not limited by the specific embodiments disclosed below.

A connection structure of a semiconductor microwave generator for a microwave oven provided by some embodiments in the first aspect of the present invention is described below with reference to FIGS. 1 to 12.

Figure 1:
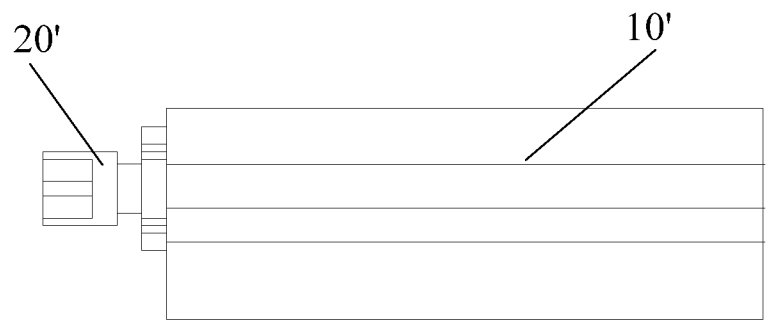
FIG. 1 is a structural schematic diagram of a connection structure of a semiconductor microwave generator used in the prior art.
Figure 2A:
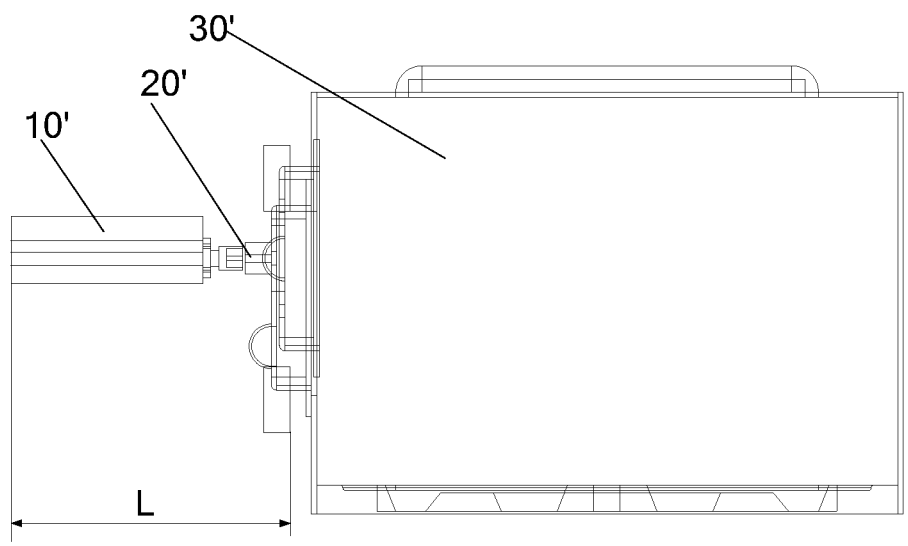
FIGS. 2A to 2B shows a microwave oven used in the prior art with the connection structure of the semiconductor microwave generator shown in FIG. 1.
Figure 2B:
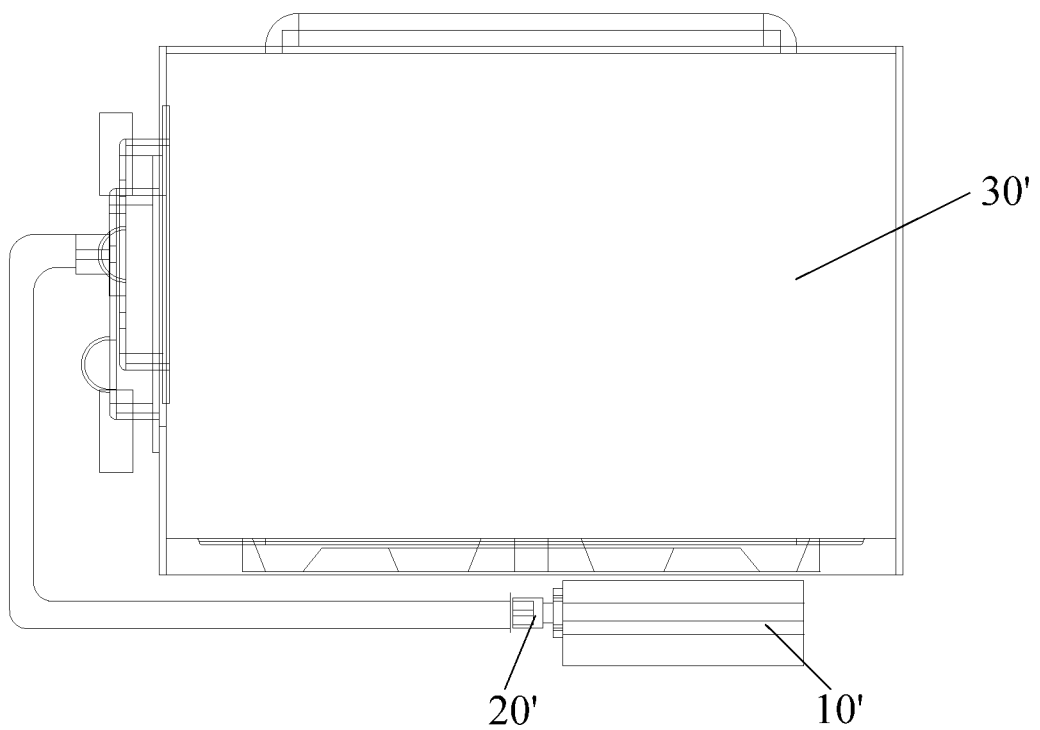
Figure 9:
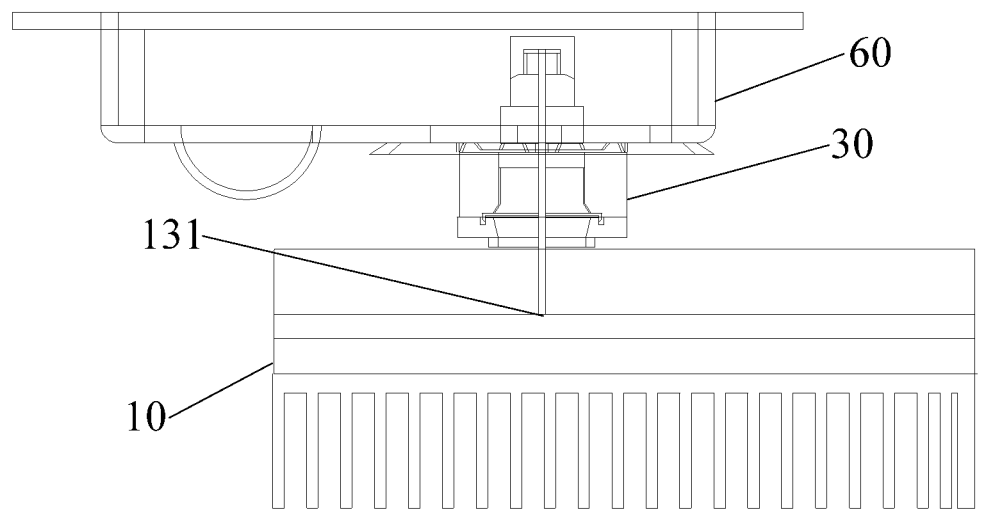
FIG. 9 is a schematic diagram of a second form of the connection structure of the semiconductor microwave generator for the microwave oven according to the first embodiment of the present invention in connection with the waveguide box.
Figure 11:
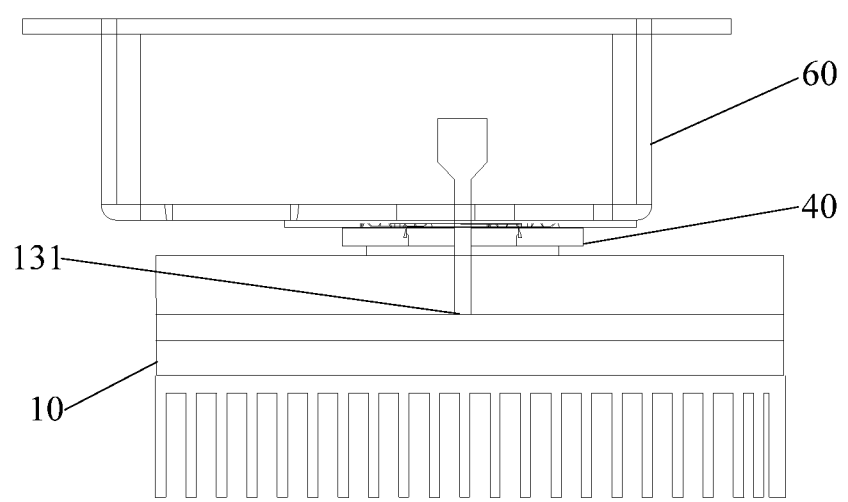
FIG. 11 is a schematic diagram of a third form of the connection structure of the semiconductor microwave generator for the microwave oven according to the first embodiment of the present invention in connection with the waveguide box.

As shown in FIGS. 1, 9 and 11, the connection structure of the semiconductor microwave generator for the microwave oven provided by some embodiments in the first aspect of the present invention comprises a semiconductor microwave generator 10 and a microwave output device 20.

A microwave signal output port 131 is arranged on the front face or the back face of the semiconductor microwave generator 10; the first end of the microwave output device 20 is connected with the microwave signal output port 131, and the second end of the microwave output device 20 communicates with a cooking cavity 50 of the microwave oven.

According to the connection structure of the semiconductor microwave generator for the microwave oven provided by the present embodiments, the microwave signal output port 131 is arranged on the front face or the back face of the semiconductor microwave generator 10; the first end of the microwave output device 20 is connected with the microwave signal output port 131, and the second end of the microwave output device 20 communicates with the cooking cavity 50. That is, the microwave output device 20 is vertically connected with the front face or the back face of the semiconductor microwave generator 10, which effectively reduces the maximum distance between the semiconductor microwave generator 10 and the cooking cavity 50, i.e., greatly reducing the value L, and further effectively reduces the size of the microwave oven, providing simple and convenient structural design and shape design of the microwave oven, thus effectively reducing the manufacturing costs of the microwave oven.

According to the connection structure of the semiconductor microwave generator for the microwave oven provided by one embodiment of the present invention, preferably, a waveguide box 60 is arranged on a wall of the cooking cavity 50, and communicates with the cooking cavity 50; a waveguide hole is formed in the top surface of the waveguide box 60.

Figure 3:
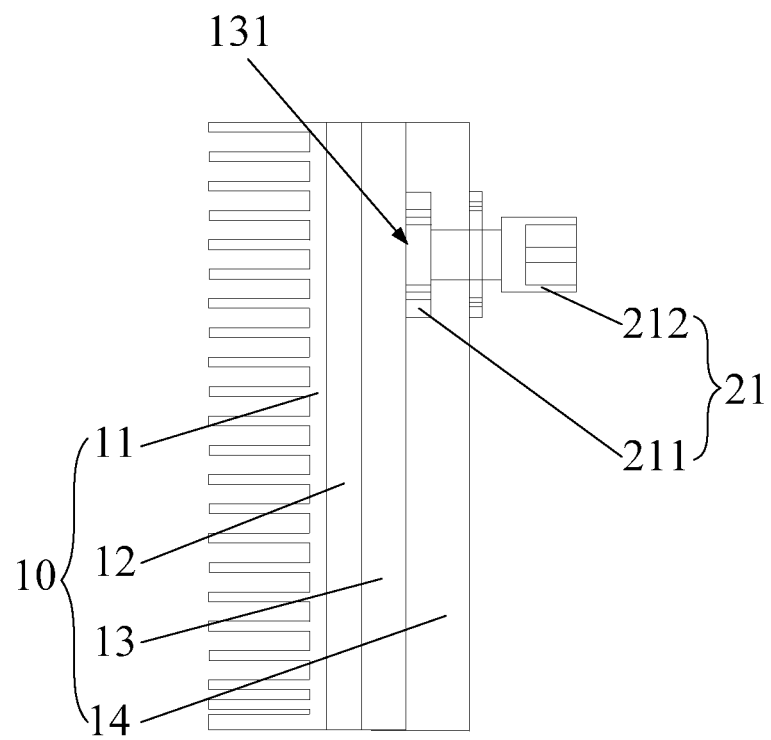
FIG. 3 is a structural schematic diagram of a first form of a connection structure of a semiconductor microwave generator for a microwave oven according to a first embodiment of the present invention.

As shown in FIG. 3, the semiconductor microwave generator 10 comprises a radiator 11, a metal substrate 12, a printed circuit board 13 and a shielding case 14, wherein the metal substrate 12 is mounted on the radiator 11; the microwave signal output port 131 is arranged on the front face of the printed circuit board 13, and the back face of the printed circuit board 13 is fixedly connected with the metal substrate 12; the shielding case 14 covers the front face and side faces of the printed circuit board 13; and the first end of the microwave output device 20 penetrates through the shielding case 14 to be connected with the microwave signal output port 131, and the second end of the microwave output device 20 communicates with the waveguide box 60 by means of the waveguide hole.

The waveguide box 60 arranged on the cooking cavity 50 makes the connection between the microwave output device 20 and the cooking cavity 50 simple and convenient. The radiator 11 can effectively ensure that the heat of the printed circuit board 13 can be dissipated to the outside immediately, thereby guaranteeing the service life of the printed circuit board 13. The metal substrate 12 makes the connection between the printed circuit board 13 and the radiator 11 simple and convenient, and due to good thermal conductivity of the metal, the heat dissipation effect of the printed circuit board 13 is effectively guaranteed. The shielding case 14 is arranged to effectively ensure that microwaves emitted by the semiconductor microwave generator 10 may completely enter the cooking cavity 50 via the microwave output device 20 and the waveguide box 60.

Optionally, the radiator 11 is cooling fins or a fan.

Figure 4:
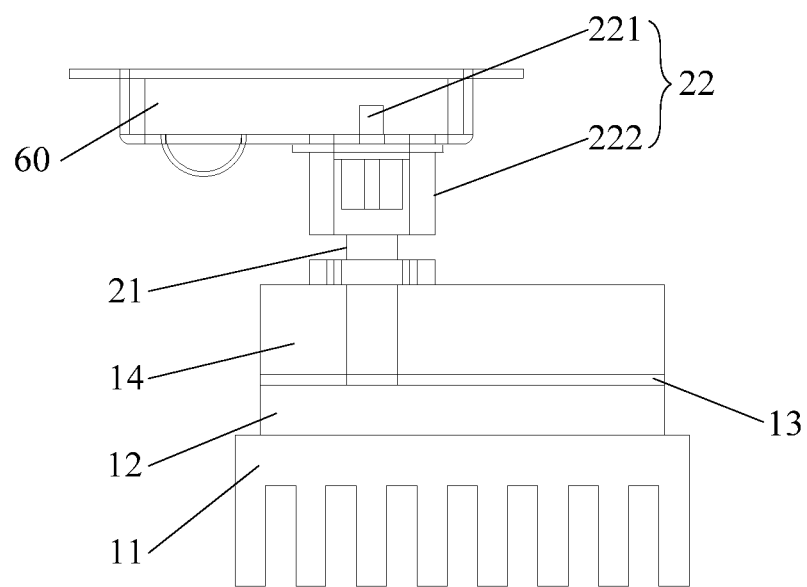
FIG. 4 is a structural schematic diagram of the connection structure of the semiconductor microwave generator for the microwave oven shown in FIG. 3 in connection with a waveguide box.

As shown in FIG. 4, in a first specific embodiment of the present embodiments, the microwave output device 20 comprises a first radio-frequency connector 21 and a second radio-frequency connector 22; a plug 212 of the first radio-frequency connector is connected with a plug 222 of the second radio-frequency connector, and one of the plug 212 of the first radio-frequency connector and the plug 222 of the second radio-frequency connector is a male terminal, and the other one is a female terminal; the socket 211 of the first radio-frequency connector is connected with the microwave signal output port 131; the socket 221 of the second radio-frequency connector is connected with the waveguide box 60 via the waveguide hole.

The microwave output device 20 comprises the first radio-frequency connector 21 and the second radio-frequency connector 22, which are mounted on the semiconductor microwave generator 10 and the waveguide box 60, respectively. By means of the connection of the matched plugs 212 and 222 of the first radio-frequency connector and the second radio-frequency connector, the semiconductor microwave generator 10 communicates with the cavity of the microwave oven. The radio-frequency connectors are simple in structure and convenient to mount; therefore, the mounting difficulty of the connection structure of the semiconductor microwave generator 10 is effectively reduced, and the assembly efficiency of the connection structure of the semiconductor microwave generator 10 is improved.

Figure 5:
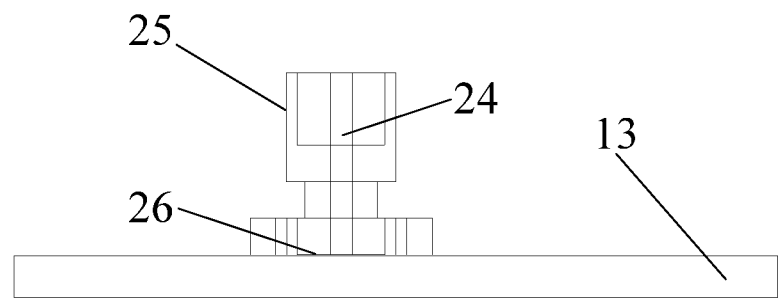
FIG. 5 is a structural schematic diagram of a connection between a microwave output device and a printed circuit board in the connection structure of the semiconductor microwave generator for the microwave oven shown in FIG. 3.

As shown in FIG. 5, optionally, the first radio-frequency connector 21 and the second radio-frequency connector 22 are both coaxial radio-frequency connectors. An inner conductor 24 of each coaxial radio-frequency connector is connected with a microstrip line 26, and an outer conductor 25 of the coaxial radio-frequency connector is kept clear of the microstrip line 26 and is connected with the printed circuit board 13.

Certainly, the above connection structure is not limited to the coaxial connectors, and is applicable to any connector model. According to different models, different fixation manners can be adopted.

Optionally, the plug 212 of the first radio-frequency connector is welded, clamped or screwed to the plug 222 of the second radio-frequency connector.

Optionally, in the case of a large distance between the plug 212 of the first radio-frequency connector and the plug 222 of the second radio-frequency connector, the plug 212 of the first radio-frequency connector may be connected with the plug 222 of the second radio-frequency connector using a cable; in this case, the positive pole of the cable connects the female terminal of the plug 212 of the first radio-frequency connector and the plug 222 of the second radio-frequency connector, and the negative pole of the cable connects the male terminal of the plug 212 of the first radio-frequency connector and the plug 222 of the second radio-frequency connector.

Figure 6:
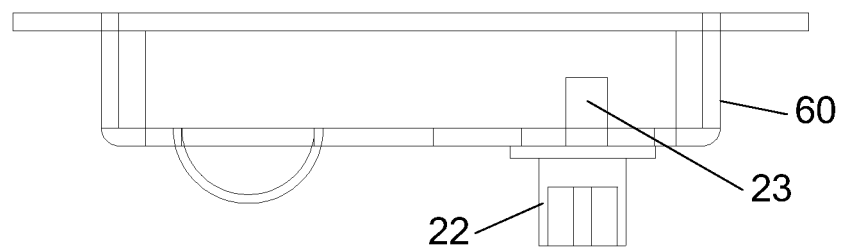
FIG. 6 is a structural schematic diagram of a first connection between the microwave output device and the waveguide box in the connection structure of the semiconductor microwave generator for the microwave oven shown in FIG. 3.
Figure 7:
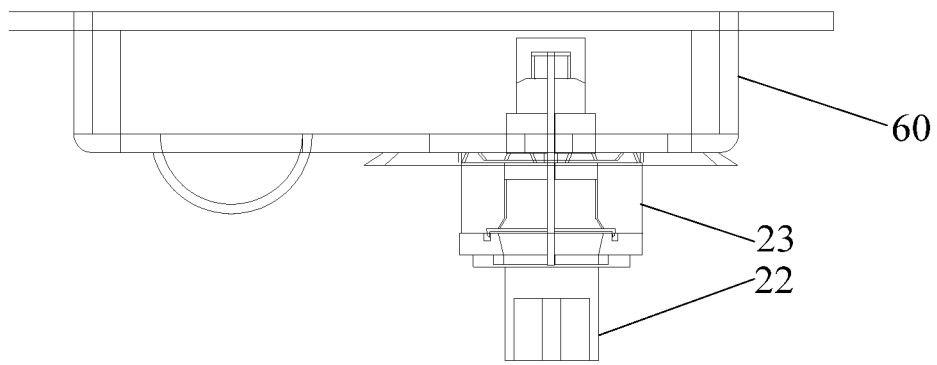
FIG. 7 is a structural schematic diagram of a second connection between the microwave output device and the waveguide box in the connection structure of the semiconductor microwave generator for the microwave oven shown in FIG. 3.
Figure 8:
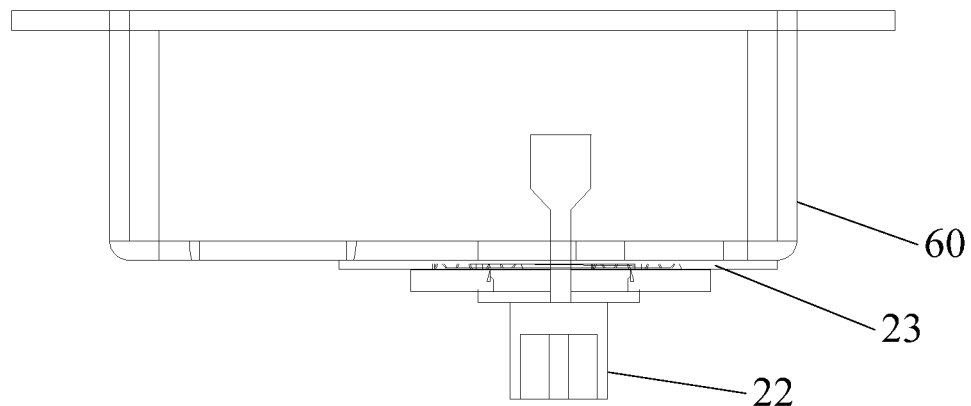
FIG. 8 is a structural schematic diagram of a third connection between the microwave output device and the waveguide box in the connection structure of the semiconductor microwave generator for the microwave oven shown in FIG. 3.

Preferably, as shown in FIGS. 6, 7 and 8, the microwave output device 20 further comprises a microwave feed-in device 23, by means of which the socket 221 of the second radio-frequency connector is connected with the waveguide box 60. The microwave feed-in device 23 is arranged to effectively ensure the microwave transmission efficiency, thereby effectively guaranteeing sufficient heating of food in the cooking cavity 50 within predetermined heating time, and further effectively improving the product quality.

Optionally, the microwave feed-in device 23 is an antenna or a probe. Both the antenna and the probe have the advantage of high efficiency, and can effectively improve the microwave transmission efficiency.

As shown in FIG. 9, in a second specific embodiment of the present embodiments, the microwave output device 20 is a magnetron output assembly 30 that comprises a magnetron antenna 314, a first bottom plate 32, a first fixing ring 33 and a second fixing ring 34; the first fixing ring 33, the second fixing ring 34 and the first bottom plate 32 are connected successively; the first bottom plate 32 is connected with the waveguide box 60; the magnetron antenna 314 is fixed on the waveguide box 60 by means of the first fixing ring 33, the second fixing ring 34 and the first bottom plate 32; one end of the magnetron antenna 314 penetrates through the shielding case 14 to be connected with the microwave signal output port 131.

The magnetron output assembly 30 comprises the magnetron antenna 314, the first bottom plate 32, the first fixing ring 33 and the second fixing ring 34, and is simple in structure, and easy to manufacture and shape; therefore, the manufacturing difficulty of the microwave output device 20 is effectively reduced. Moreover, the magnetron output assembly has the advantages of high power, high efficiency, small size, low weight, low cost and the like, thereby effectively guaranteeing sufficient heating of food in the cooking cavity 50 within predetermined heating time, and further effectively improving the product quality.

Figure 10:
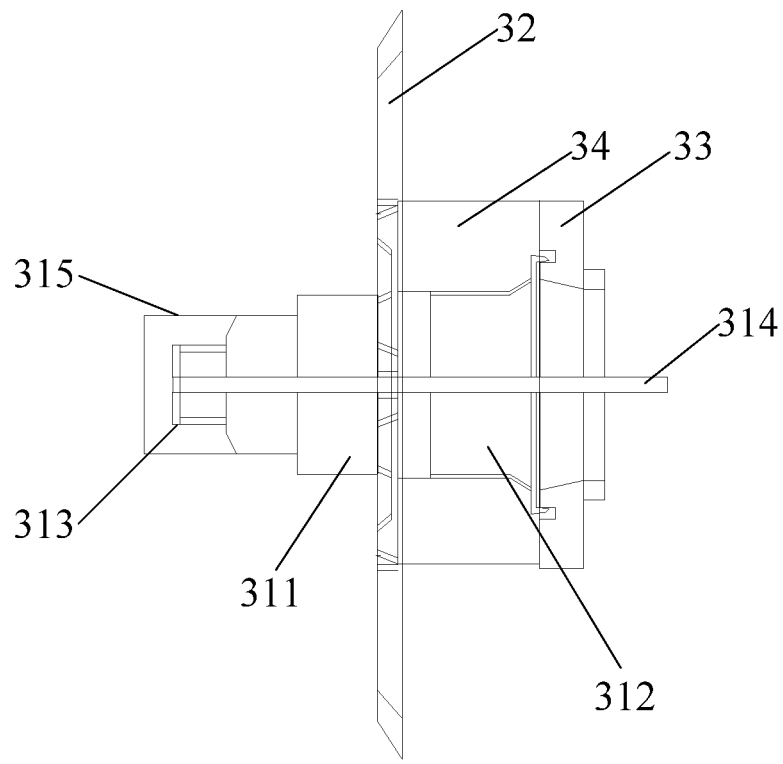
FIG. 10 is a structural schematic diagram of a microwave output device in the connection structure of the semiconductor microwave generator for the microwave oven shown in FIG. 9.

Specifically, as shown in FIG. 10, the magnetron output assembly comprises a ceramic ring 311, a positive output end tube shell 312, an exhaust port 313, the magnetron antenna 314 and an antenna cap 315; the exhaust port 313 is connected with the positive output end tube shell 312 by means of the ceramic ring 311. The antenna cap 315 is sleeved on the exhaust port 313. The magnetron antenna 314 successively penetrates through the exhaust port 313, the ceramic ring 311 and the positive output end tube shell 312. The first bottom plate 32, the first fixing ring 33 and the second fixing ring 34 are located on the ceramic ring 311 and the positive output end tube shell 312.

Figure 12:
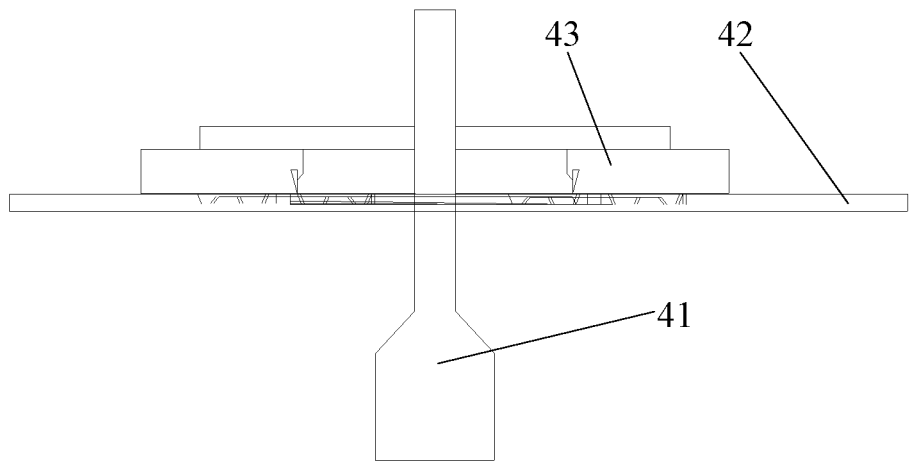
FIG. 12 is a structural schematic diagram of a microwave output device in the connection structure of the semiconductor microwave generator for the microwave oven shown in FIG. 11.

As shown in FIGS. 11 and 12, in a third specific embodiment of the present embodiments, the microwave output device is a probe output assembly 40 that comprises a probe 41, a second bottom plate 42 and a third fixing ring 43; the third fixing ring 43 is connected with the second bottom plate 42 that is fixedly connected with the waveguide box 60; the probe 41 is fixed on the waveguide box 60 by means of the second bottom plate 42 and the third fixing ring 43; one end of the probe 41 penetrates through the shielding case 14 to be connected with the microwave signal output port 131.

The probe output assembly 40 comprises the probe 41, the second bottom plate 42 and the third fixing ring 43, and is simple in structure, and easy to manufacture and shape; therefore, the manufacturing difficulty of the microwave output device 20 is effectively reduced. Moreover, the probe has good microwave conduction efficiency, thereby effectively guaranteeing sufficient heating of food in the cooking cavity 50 within predetermined heating time, and further effectively improving the product quality.

Figure 13:
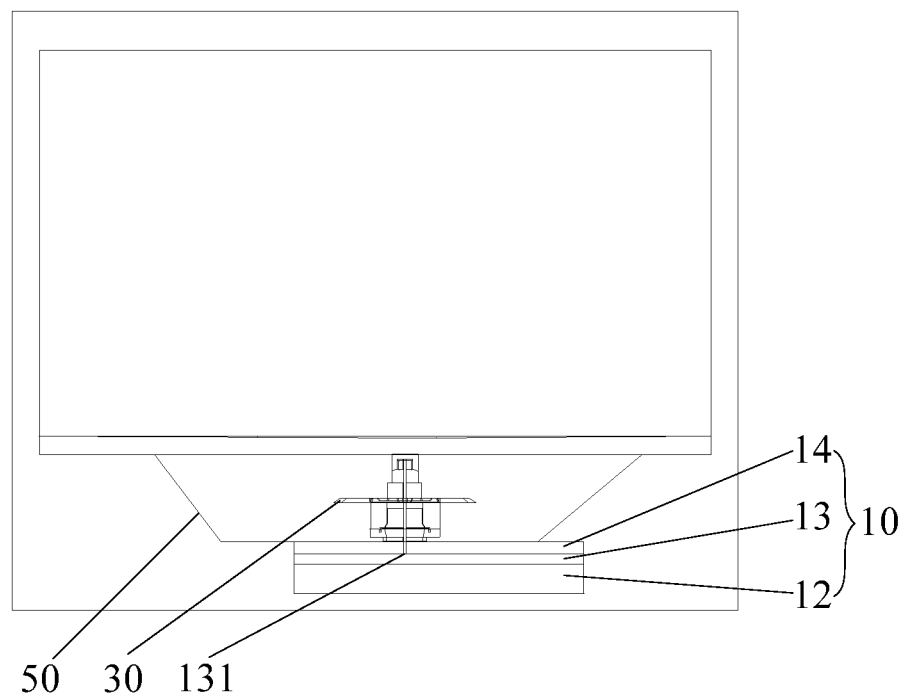
FIG. 13 is a schematic diagram of a first structure of a microwave oven according to a second embodiment of the present invention.
Figure 14:
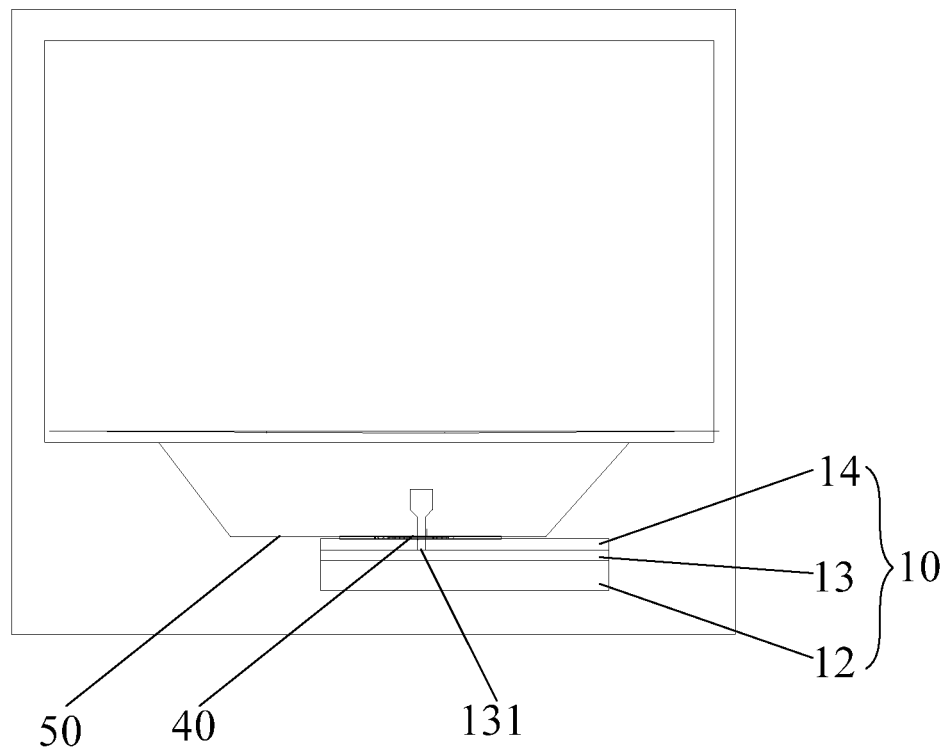
FIG. 14 is a schematic diagram of a second structure of the microwave oven according to the second embodiment of the present invention.

As shown in FIGS. 13 and 14, according to the connection structure of the semiconductor microwave generator for the microwave oven provided by another embodiment of the present invention, preferably, the semiconductor microwave generator 10 comprises a metal substrate 12, a printed circuit board 13 and a shielding case 14; the metal substrate 12 is mounted on the cooking cavity 50; the microwave signal output port 131 is arranged on the front face of the printed circuit board 13 and the back face of the printed circuit board 13 is fixedly connected with the metal substrate 12; the shielding case 14 covers the front face and side faces of the printed circuit board 13; and the first end of the microwave output device 20 penetrates through the metal substrate 12 to be connected with the microwave signal output port 131.

When the microwave oven is a flat-plate microwave oven without the waveguide box 60, the semiconductor microwave generator 10 is provided with no radiator 11. The metal substrate 12 is closely attached on the cooking cavity 50, and thus cooled by means of the cooking cavity 50 and simultaneously transmits part of its heat into the cavity. In this way, utilization of waste heat is achieved; the energy utilization rate is effectively increased and the energy sources are saved.

Figure 15:
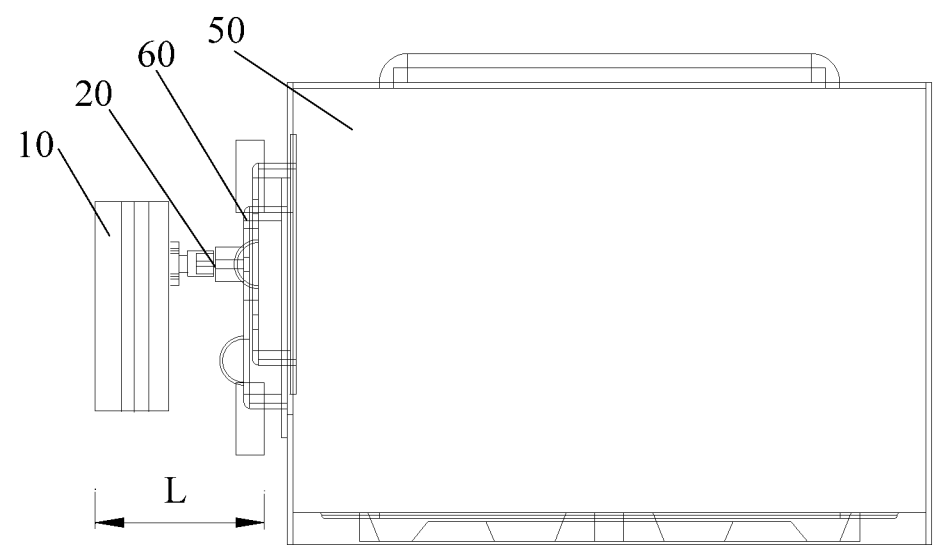
FIG. 15 is a schematic diagram of a third structure of the microwave oven according to the second embodiment of the present invention.

As shown in FIGS. 13, 14 and 15, a microwave oven provided by some embodiments in the second aspect of the present invention comprises a cooking cavity 50 and the above connection structure of the semiconductor microwave generator for the microwave oven provided by any embodiment in the first aspect. The second end of the microwave output device of the connection structure of the semiconductor microwave generator for the microwave oven communicates with the cooking cavity 50.

The microwave oven provided by the present embodiments comprises the above connection structure of the semiconductor microwave generator for the microwave oven provided by any embodiment in the first aspect, and thus the microwave oven has all the beneficial effects of the above connection structure of the semiconductor microwave generator for the microwave oven provided by any embodiment in the first aspect. That is, the microwave oven has the advantages of small size, low cost and the like.

According to one embodiment of the present invention, the connection structure of the semiconductor microwave generator for the microwave oven is located on the top wall, the bottom wall, one side wall or the rear wall of the cooking cavity 50.

The connection structure of the semiconductor microwave generator is located on the top wall, the bottom wall, the side wall or the rear wall of the cooking cavity 50, and thus can be mounted simply and conveniently; therefore, the structural design and the shape design of the microwave oven is simple and convenient, and further, the production efficiency of the microwave oven is effectively improved.

An input/output connection structure of a semiconductor microwave generator for a microwave oven provided by some embodiments in the third aspect of the present invention is described below with reference to FIG. 16.

Figure 16:
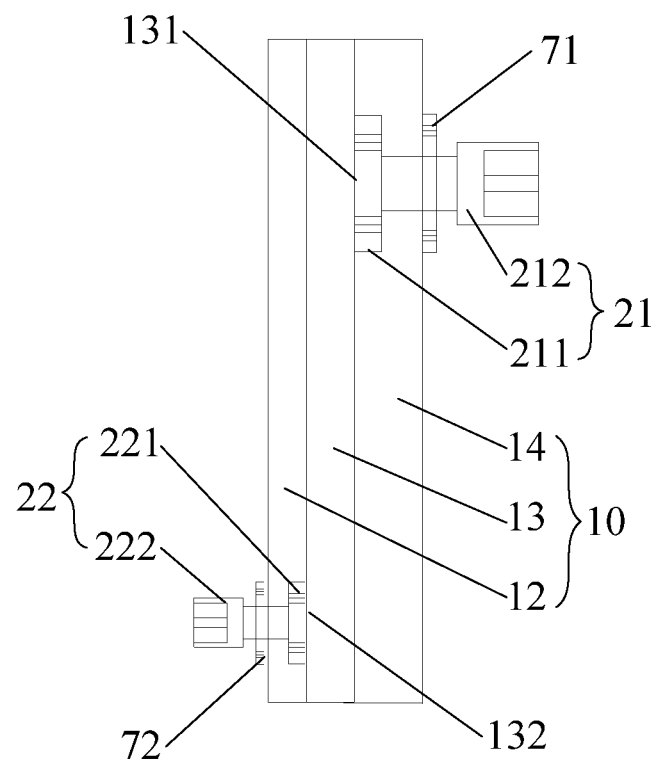
FIG. 16 is a structural schematic diagram of an input/output connection structure of a semiconductor microwave generator for a microwave oven according to a third embodiment of the present invention.

As shown in FIG. 16, the input/output connection structure of the semiconductor microwave generator for the microwave oven provided by some embodiments in the third aspect of the present invention comprises a semiconductor microwave generator 10, a microwave input device and a microwave output device.

The semiconductor microwave generator 10 is provided with a microwave signal output port 131 and a microwave signal input port 132; the microwave signal output port 131 is located on the front face or the back face of the semiconductor microwave generator 10; the microwave input device is mounted on the semiconductor microwave generator 10 and connected with the microwave signal input port 132; the microwave output device is mounted on the semiconductor microwave generator 10 and connected with the microwave signal output port 131.

According to the input/output connection structure of the semiconductor microwave generator for the microwave oven provided by the present embodiments, the microwave signal output port 131 is arranged on the front face or the back face of the semiconductor microwave generator 10; the microwave output device is mounted on the semiconductor microwave generator 131. That is, the microwave output device is vertically connected with the front face or the back face of the semiconductor microwave generator 10, which effectively reduces the maximum distance between the semiconductor microwave generator 10 and the cooking cavity, and further effectively reduces the size of the microwave oven, providing simple and convenient structural design and shape design of the microwave oven, thus effectively reducing the manufacturing costs of the microwave oven. The microwave input device is arranged to effectively ensure that the semiconductor microwave generator is capable of simultaneously receiving and sending microwave signals.

Preferably, the semiconductor microwave generator 10 comprises a metal substrate 12, a printed circuit board 13 and a shielding case 14.

The back face of the printed circuit board 13 is fixedly connected with the metal substrate 12; the microwave signal output port 131 and the microwave signal input port 132 are both arranged on the printed circuit board 13, and the microwave signal output port 131 is located on either the front face or the back face of the printed circuit board 13; the shielding case 14 covers the front face and side faces of the printed circuit board 13; the microwave output device penetrates through the shielding case 14 or the metal substrate 12 to be mounted on the printed circuit board 13 oppositely to the microwave signal output port 131.

The metal substrate 12 makes the connection between the printed circuit board 13 and the radiator simple and convenient, and due to good thermal conductivity of the metal, the heat dissipation effect of the printed circuit board 13 is effectively guaranteed. The shielding case 14 is arranged to effectively ensure the leakproofness of the semiconductor microwave generator 10.

Specifically, the microwave output device is a first radio-frequency connector 21, a socket 211 of which is connected with the microwave signal output port 131; a plug 212 of the first radio-frequency connector extends out of the shielding case 14 or the metal substrate 12, and is fixedly connected with the shielding case 14 or the metal substrate 12 by means of a first flange plate 71; the microwave input device is a second radio-frequency connector 22, a socket 221 of which is connected with the microwave signal input port 132; a plug 222 of the second radio-frequency connector is located outside the semiconductor microwave generator 10.

The radio-frequency connectors are simple in structure and convenient to mount; therefore, the mounting difficulty of the connection structure of the semiconductor microwave generator 10 is effectively reduced, and the assembly efficiency of the connection structure of the semiconductor microwave generator is improved. The first flange plate 71 is arranged to guarantee the strength of the connection between the plug 212 of the first radio-frequency connector and the shielding case 14 or the metal substrate 12 on one hand, and guarantee the leakproofness between the plug 212 of the first radio-frequency connector and the semiconductor microwave generator 10 on the other hand.

Preferably, the socket 211 of the first radio-frequency connector is welded, clamped or screwed to the printed circuit board 13. The microwave signal input port 132 is located on the front face, the back face or one side face of the printed circuit board 13. The plug 222 of the second radio-frequency connector penetrates through the shielding case 14 or the metal substrate 12, and is fixedly connected with the shielding case 14 or the metal substrate 12 by means of a second flange plate 72.

Welded, clamped and screwed connections all have good connection strength, thereby effectively guaranteeing the strength of the connection between the socket 211 of the first radio-frequency connector and the printed circuit board 13. The plug 222 of the second radio-frequency connector is fixedly connected with the shielding case 14 or the metal substrate 12 by means of the second flange plate 72. The second flange plate 72 is arranged to guarantee the strength of the connection between the plug 222 of the second radio-frequency connector and the shielding case 14 or the metal substrate 12 on one hand, and guarantee the leakproofness between the plug 222 of the second radio-frequency connector and the semiconductor microwave generator 10 on the other hand.

Optionally, the microwave output device is a magnetron output assembly that comprises a magnetron antenna, a first bottom plate and a first fixing ring; the first fixing ring and the first bottom plate are sleeved on the magnetron antenna; one end of the magnetron antenna penetrates through the shielding case 14 or the metal substrate 12 to be connected with the microwave signal output port 131.

The magnetron output assembly comprises the magnetron antenna, the first bottom plate and the first fixing ring, and is simple in structure, and easy to manufacture and shape; therefore, the manufacturing difficulty of the microwave output device is effectively reduced. Moreover, the magnetron output assembly has the advantages of high power, high efficiency, small size, low weight, low cost and the like, thereby effectively guaranteeing sufficient heating of food in the cooking cavity within predetermined heating time, and further effectively improving the product quality.

Alternatively, the microwave output device is a probe output assembly that comprises a probe, a second bottom plate and a second fixing ring; the second fixing ring and the second bottom plate are sleeved on the probe; one end of the probe penetrates through the shielding case 14 or the metal substrate 12 to be connected with the microwave signal output port 131.

The probe output assembly comprises the probe, the second bottom plate and the second fixing ring, and is simple in structure, and easy to manufacture and shape; therefore, the manufacturing difficulty of the microwave output device is effectively reduced. Moreover, the probe has good microwave conduction efficiency, thereby effectively guaranteeing sufficient heating of food in the cooking cavity within predetermined heating time, and further effectively improving the product quality.

A microwave oven (not shown in the drawings) provided by some embodiments in the fourth aspect of the present invention comprises a cooking cavity, and the above input/output connection structure of the semiconductor microwave generator for the microwave oven provided by any embodiment in the third aspect. The microwave input device of the input/output connection structure of the semiconductor microwave generator for the microwave oven communicates with the cooking cavity.

The microwave oven provided by the present embodiments comprises the above input/output connection structure of the semiconductor microwave generator for the microwave oven provided by any embodiment in the third aspect, and thus the microwave oven has all the beneficial effects of the above input/output connection structure of the semiconductor microwave generator for the microwave oven provided by any embodiment in the third aspect. That is, the microwave oven has the advantages of small size, low cost and the like.

Preferably, the input/output connection structure of the semiconductor microwave generator for the microwave oven is located on the top wall, the bottom wall, one side wall or the rear wall of the cooking cavity.

The input/output connection structure of the semiconductor microwave generator is located on the top wall, the bottom wall, the side wall or the rear wall of the cooking cavity, and thus can be mounted simply and conveniently; therefore, the structural design and the shape design of the microwave oven is simple and convenient, and further, the production efficiency of the microwave oven is effectively improved.

A connection structure of a semiconductor microwave generator for a microwave oven provided by some embodiments in the fifth aspect of the present invention is described below with reference to FIG. 17.

Figure 17:
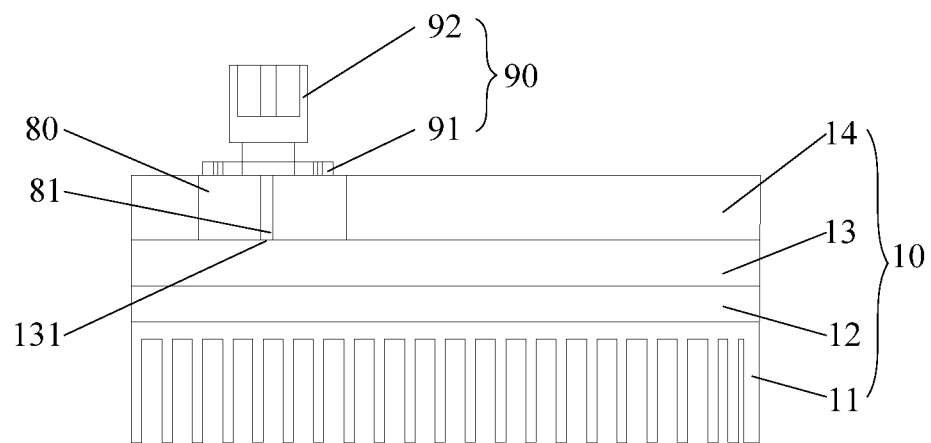
FIG. 17 is a structural schematic diagram of a connection structure of a semiconductor microwave generator for a microwave oven according to a fifth embodiment of the present invention.

As shown in FIG. 17, the connection structure of the semiconductor microwave generator for the microwave oven provided by some embodiments in the fifth aspect of the present invention comprises a semiconductor microwave generator 10, a microwave input device and a microwave output device.

The semiconductor microwave generator 10 is provided with a microwave signal output port 131 and a microwave signal input port (not shown in the figure); the microwave signal output port 131 is located on the front face or the back face of the semiconductor microwave generator 10; the microwave input device is connected with the microwave signal input port; the microwave output device is connected with the microwave signal output port 131 by means of a converter 80.

According to the connection structure of the semiconductor microwave generator for the microwave oven provided by the present embodiments, the microwave signal output port 131 is arranged on the front face or the back face of the semiconductor microwave generator 10; the microwave output device is connected with the microwave signal output port 131. That is, the microwave output device is vertically connected with the front face or the back face of the semiconductor microwave generator 10, which effectively reduces the maximum distance between the semiconductor microwave generator 10 and the cooking cavity, and further effectively reduces the size of the microwave oven, providing simple and convenient structural design and shape design of the microwave oven, thus effectively reducing the manufacturing costs of the microwave oven. In addition, the converter 80 is simple in structure, such that the connection between the microwave output device and the microwave signal output port 131 is simple and reliable; therefore, the assembly difficulty of the connection structure of the semiconductor microwave generator is effectively reduced.

Specifically, the semiconductor microwave generator 10 comprises a radiator 11, a metal substrate 12, a printed circuit board 13 and a shielding case 14.

The metal substrate 12 is mounted on the radiator 11; the back face of the printed circuit board 13 is fixedly connected with the metal substrate 12; the microwave signal output port 131 and the microwave signal input port are both arranged on the printed circuit board 13; the microwave signal output port 131 is located on either the front face or the back face of the printed circuit board 13, and the converter 80 is mounted on the printed circuit board 13 oppositely to the microwave signal output port 131; and the shielding case 14 covers the front face and side faces of the printed circuit board 13.

The radiator 11 effectively ensures that the heat of the printed circuit board 13 can be dissipated to the outside immediately, thereby guaranteeing the service life of the printed circuit board 13. The metal substrate 12 makes the connection between the printed circuit board 13 and the radiator 11 simple and convenient, and due to good thermal conductivity of the metal, the heat dissipation effect of the printed circuit board 13 is effectively guaranteed. The shielding case 14 is arranged to effectively ensure the leakproofness of the semiconductor microwave generator.

Optionally, the radiator 11 is cooling fins or a fan.

Preferably, the converter 80 is provided with a microstrip line 81; a first end of the microstrip line 81 is connected with the microwave output device, and a second end of the microstrip line 81 is connected with the microwave signal output port 131.

Specifically, the converter 80 is a metal block; an epoxy resin layer is arranged between the microstrip line 81 and the metal block; the microstrip line 81 is a copper wire. The epoxy resin part is used to isolate the microstrip line 81 from the metal block, thereby effectively avoiding the influence of the metal block on the usability of the microstrip line 81; therefore, the using effect of the microstrip line 81 is guaranteed.

According to a specific embodiment of the present embodiments, preferably, the microwave output device is a third radio-frequency connector 90, a socket 91 of which is connected with the first end of the microstrip line 81.

The third radio-frequency connector 90 is simple in structure and convenient to mount; therefore, the mounting difficulty of the connection structure of the semiconductor microwave generator is effectively reduced, and the assembly efficiency of the connection structure of the semiconductor microwave generator is improved.

Specifically, the socket 91 of the third radio-frequency connector is welded, clamped or screwed to the converter 80; the converter 80 is welded, clamped or screwed to the printed circuit board 13; the plug 92 of the third radio-frequency connector may be connected with the cooking cavity. Welded, clamped and screwed connections all have good connection strength, thereby effectively guaranteeing the strength of the connection between the socket 91 of the radio-frequency connector and the printed circuit board 13, and the strength of the connection between the converter 80 and the printed circuit board 13.

According to another embodiment of the present embodiments, the microwave output device is a magnetron output assembly (not shown in the figure) that comprises a magnetron antenna, a first bottom plate and a first fixing ring; the first fixing ring and the first bottom plate are sleeved on the magnetron antenna; one end of the magnetron antenna is connected with the first end of the microstrip line 81.

The magnetron output assembly comprises the magnetron antenna, the first bottom plate and the first fixing ring, and is simple in structure, and easy to manufacture and shape; therefore, the manufacturing difficulty of the microwave output device is effectively reduced. Moreover, the magnetron output assembly has the advantages of high power, high efficiency, small size, low weight, low cost and the like, thereby effectively guaranteeing sufficient heating of food in the cooking cavity within predetermined heating time, and further effectively improving the product quality.

According to yet another specific embodiment of the present embodiments, the microwave output device is a probe output assembly (not shown in the figure) that comprises a probe, a second bottom plate and a second fixing ring; the second fixing ring and the second bottom plate are sleeved on the probe; one end of the probe is connected with the first end of the microstrip line 81.

The probe output assembly comprises the probe, the second bottom plate and the second fixing ring, and is simple in structure, and easy to manufacture and shape; therefore, the manufacturing difficulty of the microwave output device is effectively reduced. Moreover, the probe has good microwave conduction efficiency, thereby effectively guaranteeing sufficient heating of food in the cooking cavity within predetermined heating time, and further effectively improving the product quality.

It needs to be noted that the radio-frequency connector in the present embodiments is revised as the third radio-frequency connector in order to distinguish the radio-frequency connector in the present embodiments from the first radio-frequency connector and the second radio-frequency connector in the embodiments of the first aspect, the embodiments of the second aspect, the embodiments of the third aspect and the embodiments of the fourth aspect; substantially, the third radio-frequency connector may be the first radio-frequency connector or the second radio-frequency connector; and the words "first", "second" and "third" are only used for description.

A microwave oven (not shown in the drawings) provided by some embodiments in the sixth aspect of the present invention comprises a cooking cavity, and the above connection structure of the semiconductor microwave generator for the microwave oven provided by any embodiment in the fifth aspect. The microwave output device of the connection structure of the semiconductor microwave generator for the microwave oven communicates with the cooking cavity.

The microwave oven provided by the present embodiments comprises the above connection structure of the semiconductor microwave generator for the microwave oven provided by any embodiment in the fifth aspect, and thus the microwave oven has all the beneficial effects of the above connection structure of the semiconductor microwave generator for the microwave oven provided by any embodiment in the fifth aspect. That is, the microwave oven has the advantages of small size, low cost and the like.

Preferably, the connection structure of the semiconductor microwave generator for the microwave oven is located on the top wall, the bottom wall, one side wall or the rear wall of the cooking cavity.

The connection structure of the semiconductor microwave generator is located on the top wall, the bottom wall, the side wall or the rear wall of the cooking cavity, and thus can be mounted simply and conveniently; therefore, the structural design and the shape design of the microwave oven is simple and convenient, and further, the production efficiency of the microwave oven is effectively improved.

In summary, according to the connection structure of the semiconductor microwave generator for the microwave oven provided by the embodiments in the first aspect of the present invention, the microwave output device is vertically connected with the front face or the back face of the semiconductor microwave generator, which effectively reduces the maximum distance between the semiconductor microwave generator and the cooking cavity, and further effectively reduces the size of the microwave oven, providing simple and convenient structural design and shape design of the microwave oven, thus effectively improving the production efficiency of the microwave oven, and reducing the manufacturing costs of the microwave oven. The microwave oven provided by the embodiments in the second aspect of the present invention has the advantages of small size, low cost and the like. According to the input/output connection structure of the semiconductor microwave generator for the microwave oven provided by the embodiments in the third aspect of the present invention, the microwave signal output port is arranged on the front face or the back face of the semiconductor microwave generator; the microwave output device is connected with the microwave signal output port; that is, the microwave output device is vertically connected with the front face or the back face of the semiconductor microwave generator, which effectively reduces the maximum distance between the semiconductor microwave generator and the cooking cavity, and further effectively reduces the size of the microwave oven, providing simple and convenient structural design and shape design of the microwave oven, thus effectively reducing the manufacturing costs of the microwave oven. The microwave oven provided by the embodiments in the fourth aspect of the present invention has the advantages of small size, low cost and the like. According to the connection structure of the semiconductor microwave generator for the microwave oven provided by the embodiments in the fifth aspect of the present invention, the microwave signal output port is arranged on the front face or the back face of the semiconductor microwave generator; the microwave output device is connected with the microwave signal output port; that is, the microwave output device is vertically connected with the front face or the back face of the semiconductor microwave generator, which effectively reduces the maximum distance between the semiconductor microwave generator and the cooking cavity, and further effectively reduces the size of the microwave oven, providing simple and convenient structural design and shape design of the microwave oven, thus effectively reducing the manufacturing costs of the microwave oven; in addition, the converter is simple in structure, such that the connection between the microwave output device and the microwave signal output port is simple and reliable; therefore, the assembly difficulty of the connection structure of the semiconductor microwave generator is effectively reduced. The microwave oven provided by the embodiments in the sixth aspect of the present invention has the advantages of small size, low cost and the like.

In the descriptions of the present invention, the terms "first", "second" and "third" are merely used for description, and cannot be interpreted as indicating or implying relative importance, unless otherwise provided or defined explicitly.

In the descriptions of the present invention, the terms "mounted", "connection", "connected", "fixed" and the like should all be interpreted broadly. For example, "connection" may be a fixed connection, a detachable connection or an integrated connection; "connected" may be directly connected, or indirectly connected by means of a intermedium. A person of ordinary skill in the art can understand the specific meanings of the above terms in the present invention according to specific situations.

In the descriptions of this specification, the descriptions with the term "one embodiment", "some embodiments", "specific embodiment" and the like are meant to indicate that specific features, structures, materials or features described in combination with the embodiments or examples are included in at least one embodiment or example of the present invention. In this specification, the schematic expressions of the above terms do not necessarily refer to the same embodiments or examples. Moreover, the described specific features, structures, materials or features may be combined in an appropriate way in any one or more embodiments or examples.

The foregoing descriptions are merely preferred embodiments of the present invention, rather than limiting the present invention. For a person skilled in the art, various modifications and variations can be made to the present invention. Any modification, equivalent substitution, improvement and the like made within the spirit and the principle of the present invention should be encompassed within the protection scope of the present invention.

What is claimed is:

1. A connection structure for a microwave oven, comprising:
   a semiconductor microwave generator, on a front face or a back face of which a microwave signal output port is provided; and
   a microwave output device, wherein a first end of the microwave output device is connected to the microwave signal output port, and a second end of the microwave output device communicates with a cooking cavity of the microwave oven,
   wherein the microwave output device is vertically connected to the front face or the back face of the semiconductor microwave generator such that the microwave output device extends in a direction normal to the front face or the back face of the semiconductor microwave generator;
   wherein the microwave output device comprises:
      a first radio frequency connector that includes a first socket that is connected to the microwave signal output port; and
      a second radio frequency connector that includes a second socket that is connected to a waveguide box through a waveguide hole;
   wherein a first plug of the first radio frequency connector is connected to a second plug of the second radio frequency connector; and
   wherein one of the first plug and the second plug is male and the other is female.

2. The connection structure according to claim 1, wherein the waveguide box is arranged on a wall of the cooking cavity, and communicates with the cooking cavity;
   the waveguide hole is formed in a top surface of the waveguide box;
   the semiconductor microwave generator comprises:
      a radiator;
      a metal substrate that is mounted on the radiator;
      a printed circuit board, wherein the microwave signal output port is arranged on a front face of the printed circuit board, and a back face of the printed circuit board is fixedly connected with the metal substrate; and
      a shielding case that covers the front face and side faces of the printed circuit board;
   the first end of the microwave output device penetrates through the shielding case and is connected with the microwave signal output port, and the second end of the microwave output device communicates with the waveguide box by means of the waveguide hole;
   the microwave output device is a magnetron output assembly that comprises a magnetron antenna, a first bottom plate, a first fixing ring and a second fixing ring;
   the first fixing ring, the second fixing ring and the first bottom plate are connected successively;
   the first bottom plate is connected with the waveguide box;
   the magnetron antenna is fixed on the waveguide box by means of the first fixing ring, the second fixing ring and the first bottom plate;
   one end of the magnetron antenna penetrates through the shielding case and is connected with the microwave signal output port.

3. The connection structure according to claim 1, wherein a waveguide box is arranged on a wall of the cooking cavity, and communicates with the cooking cavity;
   a waveguide hole is formed in a top surface of the waveguide box;
   the semiconductor microwave generator comprises:
      a radiator;
      a metal substrate that is mounted on the radiator;
      a printed circuit board, wherein the microwave signal output port is arranged on a front face of the printed circuit board, and a back face of the printed circuit board is fixedly connected with the metal substrate; and
      a shielding case that covers the front face and side faces of the printed circuit board;
   the first end of the microwave output device penetrates through the shielding case and is connected with the microwave signal output port, and the second end of the microwave output device communicates with the waveguide box by means of the waveguide hole;
   the microwave output device is a probe output assembly that comprises a probe, a second bottom plate and a third fixing ring;
   the third fixing ring is connected with the second bottom plate that is fixedly connected with the waveguide box;
   the probe is fixed on the waveguide box by means of the second bottom plate and the third fixing ring;
   one end of the probe penetrates through the shielding case and is connected with the microwave signal output port.

4. The connection structure according to claim 1, wherein the semiconductor microwave generator comprises:
   a metal substrate that is mounted on the cooking cavity;
   a printed circuit board, wherein the microwave signal output port is arranged on a front face of the printed circuit board, and the back face of the printed circuit board is fixedly connected with the metal substrate; and
   a shielding case that covers a front face and side faces of the printed circuit board; and
   wherein the first end of the microwave output device penetrates through the metal substrate and is connected with the microwave signal output port.

5. A microwave oven, comprising:
   the connection structure according to claim 1; and
   a cooking cavity;
   wherein the second end of the microwave output device communicates with the cooking cavity via the waveguide box.

6. The microwave oven according to claim 5, wherein the connection structure is located on one of a top wall, a bottom wall, a side wall and a rear wall of the cooking cavity.

7. The connection structure according to claim 1, wherein:
   the semiconductor microwave generator further comprises a microwave signal input port;
   the connection structure further comprises a microwave input device that is mounted on the semiconductor microwave generator and connected with the microwave signal input port.

8. The connection structure according to claim 7, wherein the semiconductor microwave generator comprises:

a metal substrate;
a printed circuit board, wherein:
- a back face of the printed circuit board is fixedly connected with the metal substrate;
- the microwave signal output port and the microwave signal input port are both arranged on the printed circuit board; and
- the microwave signal output port is located on either a front face or the back face of the printed circuit board; and a shielding case that covers the front face and side faces of the printed circuit board;
- wherein the microwave output device penetrates through the shielding case or the metal substrate and is mounted on the printed circuit board.

9. The connection structure according to claim 8, wherein the first plug extends out of the shielding case or the metal substrate, and is fixedly connected with the shielding case or the metal substrate by means of a first flange plate.

10. The connection structure according to claim 9, wherein the first socket of the first radio-frequency connector is welded, clamped or screwed to the printed circuit board.

11. The connection structure according to claim 8, wherein:
- the microwave output device is a magnetron output assembly that comprises a magnetron antenna, a first bottom plate and a first fixing ring;
- the first fixing ring and the first bottom plate are sleeved on the magnetron antenna; and
- one end of the magnetron antenna penetrates through the shielding case or the metal substrate and is connected with the microwave signal output port.

12. The connection structure according to claim 8, wherein:
- the microwave output device is a probe output assembly that comprises a probe, a second bottom plate and a second fixing ring;
- the second fixing ring and the second bottom plate are sleeved on the probe; and
- one end of the probe penetrates through the shielding case or the metal substrate and is connected with the microwave signal output port.

13. The connection structure according to claim 7, further comprising: a converter for connecting the microwave output device with the microwave signal output port.

14. A microwave oven, comprising:
the connection structure according to claim 7; and
a cooking cavity;
wherein the microwave output device is mounted on the semiconductor microwave generator, and
wherein the microwave input device communicates with the cooking cavity.

15. The microwave oven according to claim 14, wherein the connection structure is located on a top wall, a bottom wall, a side wall or a rear wall of the cooking cavity.

16. The microwave oven according to claim 14, wherein the connection structure further comprises a converter for connecting the microwave output device with the microwave signal output port.

17. The connection structure according to claim 13, wherein:
the semiconductor microwave generator comprises:
- a radiator;
- a metal substrate that is mounted on the radiator;
- a printed circuit board, wherein a back face of the printed circuit board is fixedly connected with the metal substrate; and
- a shielding case that covers a front face and side faces of the printed circuit board;

the microwave signal output port and the microwave signal input port are both arranged on the printed circuit board;
the microwave signal output port is located on either the front face or the back face of the printed circuit board; and
the converter is mounted on the printed circuit board opposite the microwave signal output port.

18. The connection structure according to claim 17, wherein:
- the converter is provided with a microstrip line;
- a first end of the microstrip line is connected with the microwave output device, and
- a second end of the microstrip line is connected with the microwave signal output port.

19. The connection structure according to claim 18, wherein:
- the microwave output device is a magnetron output assembly that comprises a magnetron antenna, a first bottom plate and a first fixing ring;
- the first fixing ring and the first bottom plate are sleeved on the magnetron antenna; and
- one end of the magnetron antenna is connected with the first end of the microstrip line.

20. The connection structure according to claim 18, wherein:
- the microwave output device is a probe output assembly that comprises a probe, a second bottom plate and a second fixing ring;
- the second fixing ring and the second bottom plate are sleeved on the probe; and
- one end of the probe is connected with the first end of the microstrip line.

\* \* \* \* \*